(12) United States Patent
Carolan et al.

(10) Patent No.: US 7,416,669 B1
(45) Date of Patent: Aug. 26, 2008

(54) BIOLOGICAL NUTRIENT REMOVAL PROCESS AND PROCESS CONTROL SYSTEM FOR SAME

(75) Inventors: Adrian F. Carolan, Pinson, AL (US); William F. Foreman, III, Birmingham, AL (US); John K. Shepherd, Jr., Cropwell, AL (US)

(73) Assignee: Schreiber, LLCAL (US)

( * ) Notice: Subject to any disclaimer, the term of this patent is extended or adjusted under 35 U.S.C. 154(b) by 293 days.

(21) Appl. No.: 11/361,403

(22) Filed: Feb. 24, 2006

(51) Int. Cl.
*C02F 3/30* (2006.01)

(52) U.S. Cl. .................. 210/614; 210/630; 210/903; 210/906

(58) Field of Classification Search ................ 210/605, 210/615, 630, 903, 906, 614
See application file for complete search history.

(56) References Cited

U.S. PATENT DOCUMENTS

| | | | | |
|---|---|---|---|---|
| 5,552,319 A * | 9/1996 | Yang et al. | ............... | 435/286.5 |
| 5,626,754 A * | 5/1997 | Ballnus | ............... | 210/605 |
| 5,989,428 A * | 11/1999 | Goronszy | ............... | 210/605 |
| 6,117,323 A * | 9/2000 | Haggerty | ............... | 210/605 |
| 6,426,004 B1 | 7/2002 | Hiatt et al. | | |
| 6,616,843 B1 * | 9/2003 | Behmann et al. | ............... | 210/605 |
| 6,630,067 B2 * | 10/2003 | Shieh et al. | ............... | 210/139 |
| 6,712,970 B1 * | 3/2004 | Trivedi | ............... | 210/605 |
| 7,314,563 B2 * | 1/2008 | Cho et al. | ............... | 210/605 |
| 2007/0108125 A1 * | 5/2007 | Cho et al. | ............... | 210/605 |

* cited by examiner

*Primary Examiner*—Fred Prince
(74) *Attorney, Agent, or Firm*—Bradley Arant Rose & White

(57) ABSTRACT

The present disclosure describes an improved system and method for treating wastewater or other liquid. Furthermore, the present disclosure provides a control program for operating the system and method. In one embodiment, the treatment process utilizes a biological nutrient removal activated sludge process utilizing a continuously sequencing reactor (CSR).

30 Claims, 6 Drawing Sheets

Primary Mode – Process Phases, Φ, Diagrams – Phase PreEmptive Endings

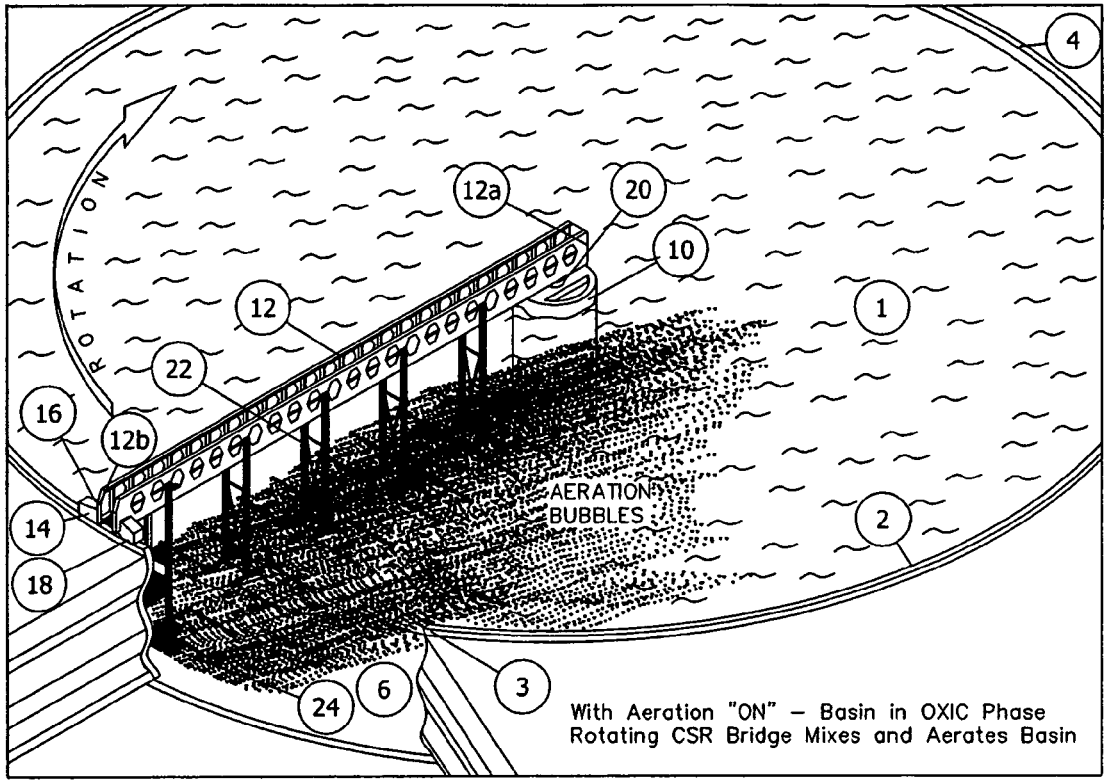
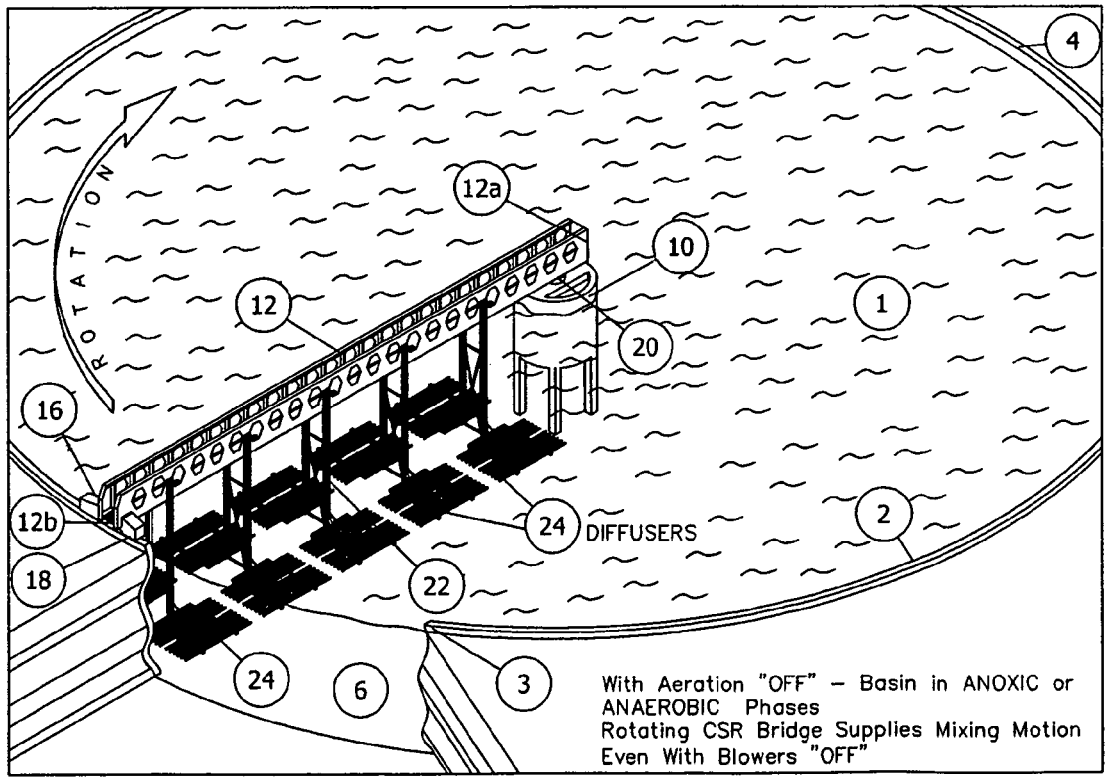
Figure 1A: CSR Bridge Motion Mixes MLSS With or Without Aeration

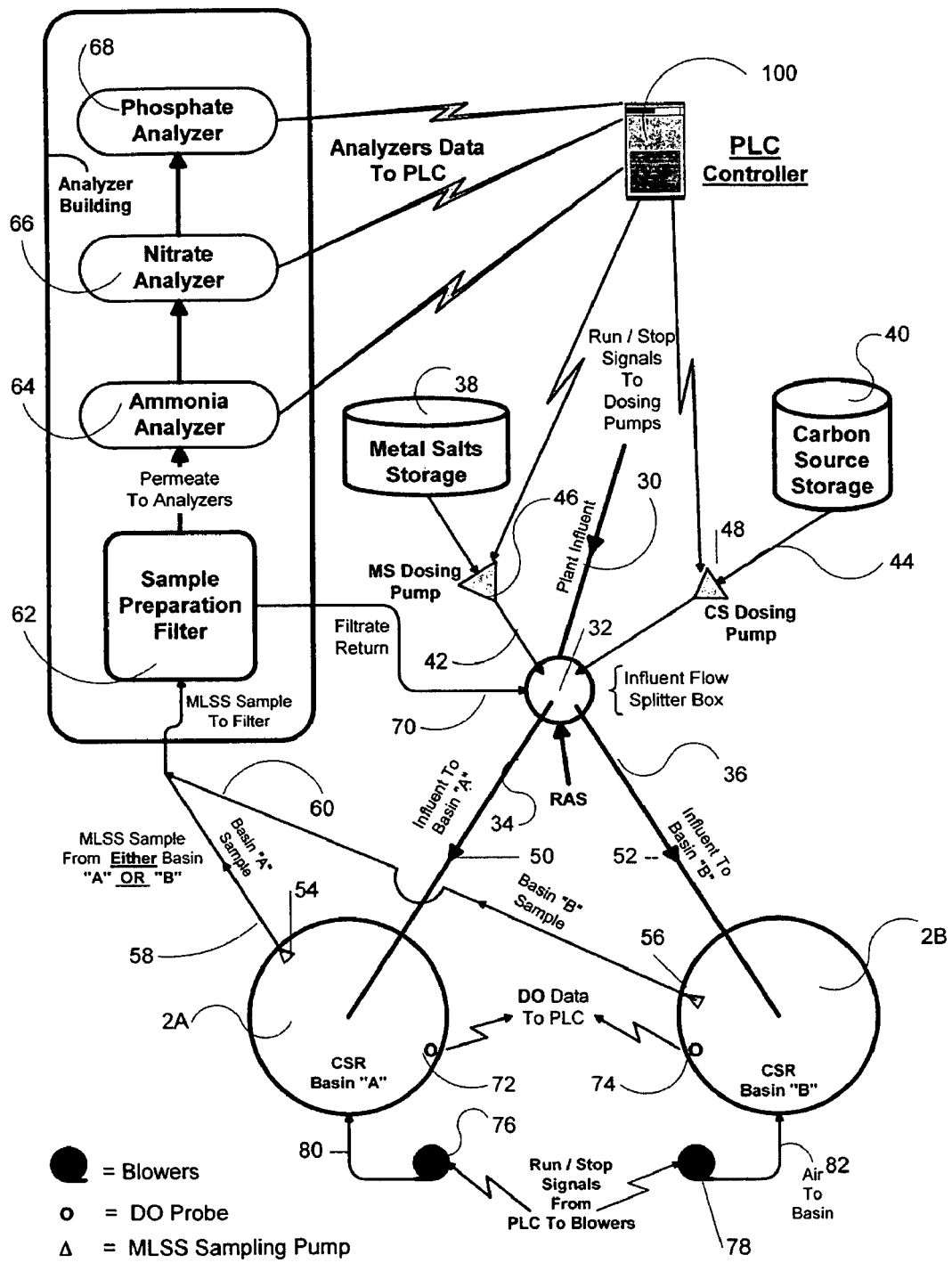
Figure 1B: Analyzers, Additives, DO and PLC Control Systems Schematic for Primary Mode

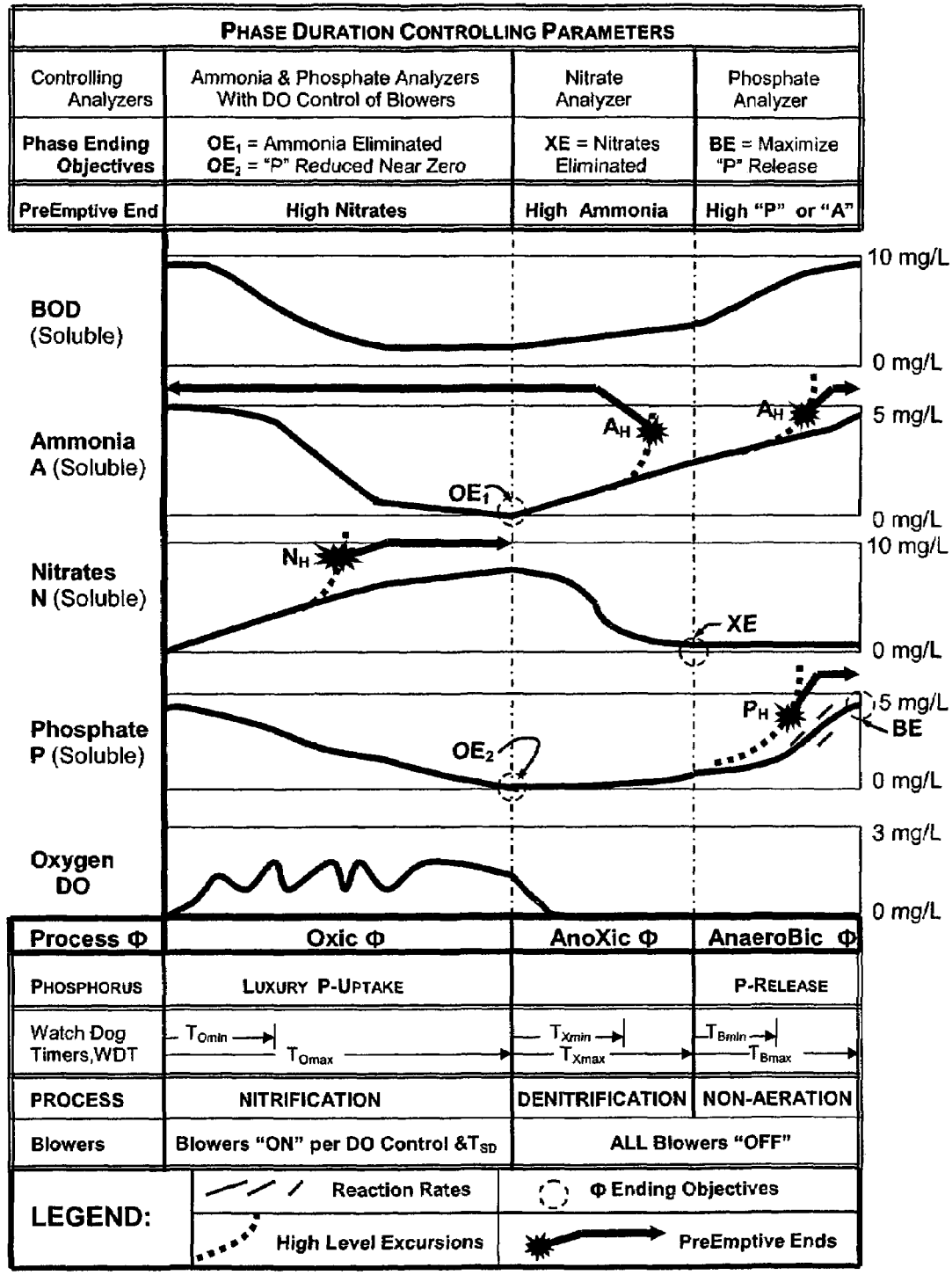
Figure 2: Primary Mode – Process Phases, Φ, Diagrams – <u>Phase PreEmptive Endings</u>

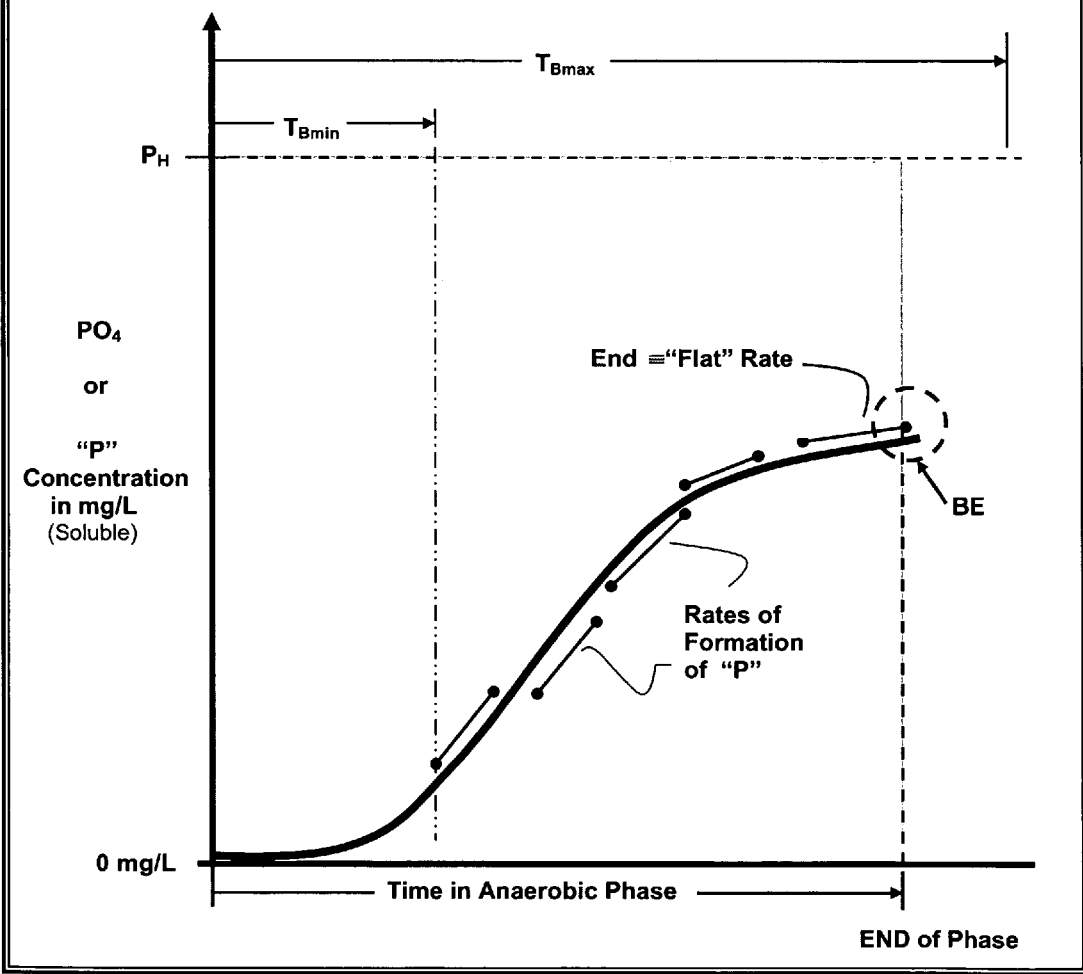
Fig 3: Primary Mode - Expanded Phosphate Concentration Curve for Anaerobic Phase

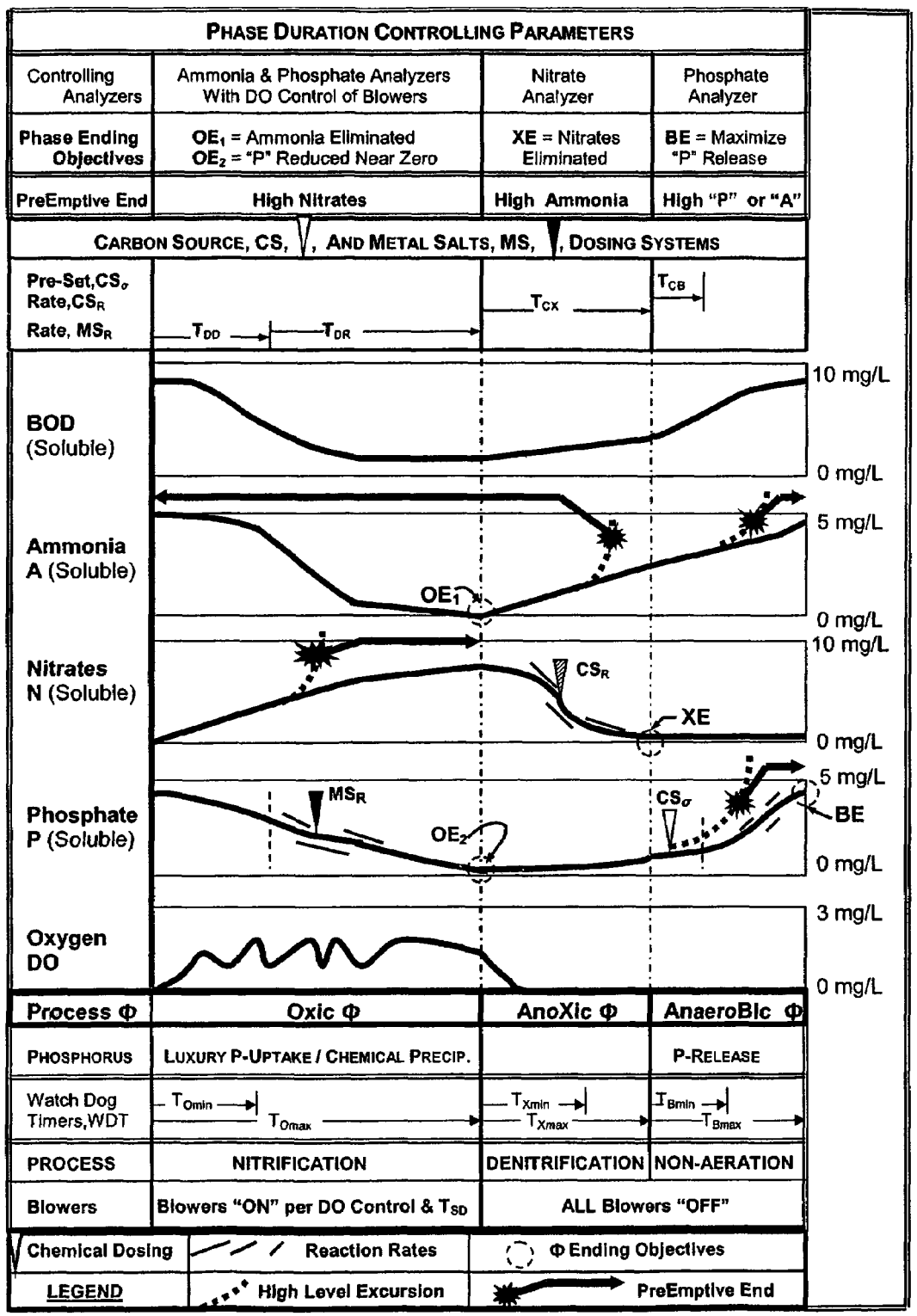
Figure 4: Primary Mode – Process Phases, Φ, Diagrams – Complete A/N/P + MS & CS

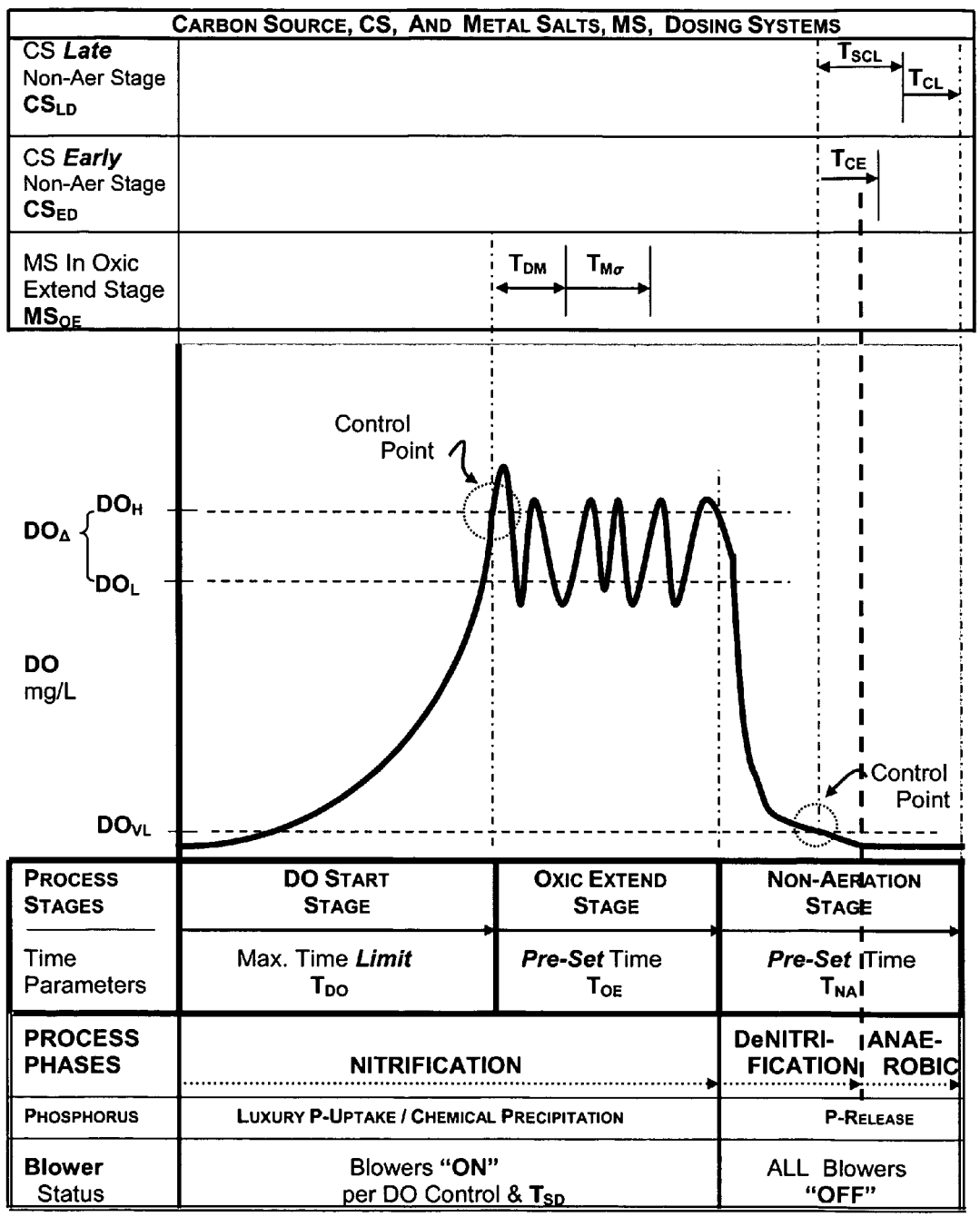
Figure 5: Secondary Mode – Process Stages Diagram – <u>Dosing Included</u>

BIOLOGICAL NUTRIENT REMOVAL PROCESS AND PROCESS CONTROL SYSTEM FOR SAME

FIELD OF THE DISCLOSURE

The present disclosure relates generally to a control system and method for optimization of a wastewater treatment system.

BACKGROUND

The prior art is aware of sequencing batch reactors as well as continuous flow reactor systems. Consistently high quality wastewater treatment has been a challenge throughout the years due to significantly varying influent characteristics coupled with stringent and demanding effluent regulations. Influent flows to a system can exhibit rapidly changing chemical and physical characteristics, as well as, considerable fluctuations in the quantity of the incoming volume. Treatment systems using activated sludge have been able to handle some of these difficulties. Given the lack of on-line computer controls, continuous flow systems have been mostly used for these purposes versus sequencing batch processes. The availability of artificial intelligence has now made possible the development of a system encompassing the benefits of both processes thus providing better controls and improved results in wastewater treatment. This optimization is enhanced by the flexibility of the system in the treatment of variable flows, minimum operator interaction required, good oxygen contact with microorganisms and substrate, and good removal efficiency.

However, the art is lacking an integrated system for addressing the optimal treatment of wastewater. The present disclosure provides a novel continuously sequencing reactor and provides an inventive control system operating in concert with a continuous flow reactor system to yield an optimization termed a continuously sequencing reactor. Such improvements were not previously known in the art.

BRIEF DESCRIPTION OF THE FIGURES

FIG. 1A is a perspective view of one embodiment of the continually sequencing reactor (CSR) biological nutrient removal system of the present disclosure illustrating a typical reactor basin.

FIG. 1B is a diagrammatic view of one embodiment of the continually sequencing reactor (CSR) biological nutrient removal system of the present disclosure illustrating the elements of the system while operated under primary mode.

FIG. 2 illustrates several of the key processes occurring during the treatment process while operated under primary mode.

FIG. 3 represents an exemplary phosphate concentration curve as may be used to determine the actual rate of phosphate elimination.

FIG. 4 illustrates the concept of the addition of chemical additives during the various phases of the treatment process while operated under primary mode.

FIG. 5 illustrates several of the key processes occurring during the treatment process while operated under secondary mode.

DETAILED DESCRIPTION

The present disclosure describes an improved system and method for treating wastewater. Furthermore, the present disclosure provides a control program for operating the system and method. In one embodiment, the treatment process utilizes a biological nutrient removal activated sludge process utilizing a continuously sequencing reactor (CSR). Each of the components will be described in more detail below.

DEFINITIONS

The following terms are given the following meanings in the instant specification.

"Activated sludge" as used herein refers to a culture of organisms developed in waste fluid treatment tanks under controlled conditions. The term also includes sludge floc produced in raw or settled waste water by the growth of zoological bacteria and other organisms in the presence of dissolved oxygen.

"Biological oxygen demand" or "BOD" as used herein refers to a test to measure the strength of wastewater. The BOD of wastewater determines the milligrams per liter of oxygen required during stabilization of decomposable organic matter by aerobic bacteria action.

"Dissolved oxygen" or "DO" as used herein refers to the oxygen dissolved in water, wastewater, or other liquid. DO is measured in milligrams per liter. If the DO of a sample of water is 2 mg/L, it means that there are 2 lbs of oxygen in 1 million lbs of water.

"Free oxygen" as used herein refers to readily available dissolved oxygen (DO).

Continuously Sequencing Reactor System

The CSR apparatus 1 is illustrated in FIG. 1A and comprises a central column 10 that is rotatably connected to a support 12. In the figures, the support 12 is illustrated as a bridge; however, the support 12 may take on other forms. The central column 10 is located within a reactor basin 2, which contains the reactor volume 6 containing the activated sludge (which may also be referred to as the mixed liquor suspended solids or MLSS). The support 12 has a first end 12a and a second end 12b, with the first end 12a rotatably connected to the central support column 10 and the second end 12b of the support 12 extends at least partially across the basin 2. The purpose of the support 12 is to provide support for the suspension assembly 22 and to move the suspension assembly 22 through the reactor volume 6 as described below. The movement of the support 12 is accomplished via a drive mechanism 14. The drive mechanism 14 may be any combination of elements that is capable of driving the support 12. In one embodiment, the drive mechanism 14 comprises a motor 16 and at least one moveable element 18 (illustrated as a wheel). The motor 16 and the moveable element 18 may be located on the second end 12b of the support 14 or the motor 16 may be located on the central column 10 with the moveable element 18 located on the second end 12b of the support 12; other locations are possible and the exact location is not critical to the present disclosure. The motor 16 can be any motor known in the art, either electrical of fuel based. In the embodiment illustrated, the moveable element engages the top portion 4 of the outer wall 3, allowing the motor 16 to propel the support around the basin 2 and to move the diffuser assemblies through the reactor volume. In one embodiment, the drive mechanism 14 moves the bridge around the top circumference of the outer wall 4 at a predetermined rate, such as but not limited to a rate of 1-5 ft/second. In an alternate embodiment, the motor 16 may be positioned on the central support column 10 without departing from the spirit of the present disclosure.

The central support column 10 may comprise a turntable support 20 to provide a rotatable support to the support 12.

The support 12 further comprises a suspension assembly 22 with at least one attached diffuser assembly 24. In one embodiment, the at least one diffuser assembly 24 comprises a plurality of individual diffusers as described below. The movement of the support 12 via the drive mechanism 14 drives the submerged components (the suspension assembly 22) through the reactor volume 6 to create a circular flow in the reactor volume 6. The circular flow is sufficient to maintain the MLSS particles in suspension and to mix the components of the reactor volume 6.

Importantly, the circular flow created is sufficient to maintain the suspension of the MLSS particles and to mix the components of the reactor volume 6 independent of aeration provided by the at least one diffuser assembly 24. Therefore, suspension and mixing occurs when the aeration is "off". Providing aeration may increase the circular flow generated by the support 12 and the suspension assembly 22. The independence of aeration and mixing of the reactor volume is an advantage of the CSR described herein. As a result, the CSR can operate for extended periods of time without aeration and achieve mechanical mixing via the movement of the bridge 12 through the reactor volume 6. This allows aeration to be used only when the biological conditions in the reactor volume 6 require aeration as described herein. Such operation conserves energy required to operate the system and provides maximum flexibility for the operator. Furthermore, the intermittent aeration produces a strong, rapidly settling floc. In contrast, most prior art activated sludge systems require aeration to provide mixing (referred to as a mixing constrained system) which limits the potential for biological optimization of the process.

An overview of one embodiment of the CSR apparatus and the additional components is provided in FIG. 1B. FIG. 1B provides an exemplary overview and it is to be understood that the placement of the various components and/or their number may be varied as would be obvious to one of ordinary skill in the art (for example, each basin 2A and 2B could be equipped with its own sample preparation filter and analyzers). The schematic in FIG. 1B shows two reactor basins, labeled 2A and 2B each operating as a CSR system. The plant influent line 30 provides input wastewater or other liquid to be treated. The plant influent line is shown terminating at an influent flow splitter box 32 that directs the influent to either of basin 2A or 2B through influent lines 34 and 36, respectively. Also illustrated are the chemical additive storage containers 38 and 40. Container 38 stores the metal salt chemical additive and container 40 stores the carbon source chemical additive. The containers 38 and 40 are in fluid communication with the influent flow splitter box 32 via lines 42 and 44, respectively. Alternatively, containers 38 and 40 may be in fluid communication with one or more of basins 2A and 2B. Line 42 further comprises a metal salt dosing pump 46 and line 44 further comprises a carbon source dosing pump 48. Lines 34 and 36 may also contain pumps 50 and 52, respectively, to aid the flow of influent into the basins 2A and 2B.

Each basin 2A and 2B is equipped with a sample pump 54 and 56, respectively, to pump out a portion of the reactor volume to the various analyzers used in the CSR system. Even when the analyzers are not operating the pumps 54 and 56 may be active to prevent fouling of the system. The sample pumps 54 and 56 transfer the sample of the wastewater or other fluid to be treated to a sample preparation filter 62 via lines 58 and 60, respectively. Only one pump 54 or 56 will be operating at one time and the operator may select which pump will be active as desired. The sample preparation filter prepares the wastewater or other fluid for analysis by the various analyzers, in this embodiment the ammonia analyzer 64, the nitrate analyzer 66 and the phosphate analyzer 68. Any unused sample may be returned to the influent flow splitter box 32 by line 70. In addition to analyzers 64, 66, and 68, a DO analyzer 72 is provided in basin 2A and another DO analyzer 74 is provided in basin 2B. The DO analyzers are illustrated positioned within the basin 2A and 2B, however other locations may also be possible. Blowers 76 and 78 provide aeration to the basin 2A and 2B through aeration lines 80 and 82, respectively. Although only 1 blower is illustrated in FIG. 1B for clarity, in one embodiment more than 1 blower is present. For example, in one embodiment, each basin is equipped with 5 blowers. In such a case, all blowers may be operated at any one time or only a portion of the blowers operated at any one time. The number of blowers operating at any one time may be determined by the process control system as described below. For example, 1 or more blowers may be kept in standby mode to replace a malfunctioning blower. The aeration lines are constructed to be in communication with the at least one diffuser assembly 24. The air exits from the at least one diffuser assembly 24 to produce aeration of the reactor volume in the basin. Any diffuser type may be used in the at least one diffuser assembly 24. In one embodiment, the diffusers may be selected from the SchreiberFlex Dual Air Header Diffuser Assemblies, the SchreiberFlex Single Air Header Diffuser Assemblies or a combination of the foregoing.

Also provided is a process control system comprising a controller 100. The controller 100 comprises a processing element capable of carrying out the various calculations and control requirements described herein. The controller 100 may be a computer or the like. The controller 100 may be any element that is capable of receiving information from the analyzers, manipulating that information if required (such as in the calculation of rates of change), comparing that information to a set of encoded instructions and directing a response to the information (such as, but not limited to, dosing of a chemical additive or staging up or down a blower to modulate DO concentrations). The controller 100 is in communication with the various components of the CSR 1 as indicated. For example, pumps 46 and 48 are in communication with the process control system controller 100 and the controller 100 operates the pumps 46 and 48 as described herein. Furthermore, the controller is in communication with the analyzers 64, 66, 68, 72 and 74, as well as the blowers 76 and 78. The communication may occur via any mechanism known in the art. For example, each of the aforementioned components may be hardwired to the controller 100 or be in wireless communication with the controller 100. Furthermore, the communication between the various components and the controller 100 may take place over a network so that the controller 100 may be a great distance away from the CSR. Furthermore, the controller 100 may be in communication with an additional device, such as a remote computer, such that the status of the CSR may be viewed by a third party. The third party may also be able to change certain operating parameters of the CSR through interactions with the controller 100. In addition, the ability to provide such remote access to the operating status of the CSR may allow a third party to diagnose problems and suggest solutions during operation of the CSR without having to physically visit the site.

In the embodiment described above, the chemical additive dosing system adds the various chemical additives into the influent flow splitter box 32, so the chemical additive is added to both basins 2A and 2B. Therefore, the addition of a chemical additive impacts the chemistry of both basin 2A and 2B. If desired, the system could be modified so that the chemical additive dosing system was basin specific. For example, the line 42, which doses the metal salt chemical additive, could be directed to line 34 for input to basin 2A and line 36 for input to basin 2B. A simple valve (not shown) could be used to direct the metal salt chemical additive to the desired basin. In contrast, the DO analyzer is basin specific, with each basin being equipped with at least 1 blower specific for a particular basin.

The components of the CSR system may be obtained from commercially available sources. In one embodiment, chemical analyzers such as those purchased from WTW (referred to as the TresCon® line) are used. Specifically, the TresCon® $NO_x$—N analyzer (range of 0.1 to 25 mg/L in 0.01 mg/L increments with an accuracy of +/−2%) measures the nitrate concentrations, the TresCon® $NH_4$—N (range of 0.1 to 10 mg/L in 0.01 mg/L increments with an accuracy of +/−5%) analyzer measures the ammonia concentrations and the TresCon® $PO_4$—P analyzer (range of 0.1 to 3 mg/L in 0.01 mg/L increments with an accuracy of +/−2%) measures the phosphate concentrations. These analyzers output data in mg/L format, although other formats may be used if desired. Other analyzers may also be used as would be obvious to one of ordinary skill in the art. The DO analyzer may be any DO measuring device known in the art. In on embodiment, the DO analyzer has a range of 0 to 5 mg/L, measures in 0.01 mg/L increments with and accuracy of +/−2%.

The sample preparation filter prepares the sample from the basin for analysis by the ammonia, nitrate and phosphate analyzers. The sample preparation filter removes impurities from the sample so that the analyzers will not become clogged and will operate effectively. Any filtration system sufficient for this purpose may be used. In one embodiment, the filtration system is the Purcon® filtration system from WTW.

Phases of CSR Operation

The CSR process utilizes the three biological phases associated with such process: (i) an oxic phase; (ii) an anoxic phase; and (iii) an anaerobic phase. The CSR of the present disclosure provides all three phases in a single reactor basin, with the three phases being separated temporally. In other words, the three phases occur in the same basin separated by time. Most prior art biological nutrient removal activated sludge process require two or three separate basins to complete the three phases above. The CSR system utilizes process cycling (or sequencing) to execute all three phases in a single basin.

The oxic, anoxic and anaerobic phases occur sequentially one after the other in the single basin 2. A "sequence" is defined as the completion of 1 each of the oxic, anoxic and anaerobic phases. In one embodiment, a sequence may be defined as the completion of the oxic, anoxic and anaerobic phases, in that order (i.e. from the start of the oxic phase through completion of the anaerobic phase). The sequence of the various phases occurs continuously in the same order (hence continuously sequencing reactor). In one embodiment, the first phase is the oxic phase, the second phase is the anoxic phase and the third phase is the anaerobic phase. The duration of each phase can be varied, either automatically or manually, from sequence to sequence in response to the biological loading of the reactor volume or other factors. The biological loading may be determined by sampling the reactor volume or may be estimated using techniques known in the art. During the oxic, anoxic and anaerobic phases, influent may continue to flow into the basin and portions of the reactor volume may be removed from the basin 2 as would be known to one of ordinary skill in the art.

FIG. 2 illustrates the basic processes occurring in each phase of the CSR system and provides information about the activities taking place within each phase. Each of these phases will be described in more detail below. While the duration of each phase within a sequence may vary, the phase will occur in the same order during each sequence. Furthermore, the duration of a given phase between sequences may also vary depending on the starting conditions of each sequence.

Oxic Phase

In one embodiment, the oxic phase is considered to be the first phase of each sequence in the CSR system. During the oxic phase, the blowers are turned "on", meaning that air is forced by one or more blowers through the diffuser assemblies 24 into the reactor volume. As the support 12 rotates around the basin 2, the at least one diffuser assembly distribute oxygen containing air throughout the reactor volume. As a result, the entire reactor volume is transformed into a free oxygen containing (or oxygen rich) environment during the oxic phase. As a result, the bacteria present in the activated sludge have a readily available source of DO for bacterial respiration. The oxic phase is characterized by two processes. One is soluble BOD conversion and the other is the nitrification process (the conversion of ammonia to nitrates) and the enhanced uptake of phosphates by the bacteria.

During the oxic phase, the soluble ammonia concentration gradually decreases from a high value at the beginning of the oxic phase to about 0 mg/L concentration at the end of the oxic phase. Likewise, the soluble phosphate concentration follows a similar pattern. In contrast, soluble nitrates increase from around about 0 mg/L to a high value at the end of the oxic phase as the ammonia is converted into nitrates. The nitrification that occurs during the oxic phase can be considered a major biological process of the oxic phase with the enhanced uptake of phosphate also being important. The DO content is maintained at a value of from about 1 to 3 mg/L during the oxic phase, with an initial value of 0 mg/L. The BOD (biochemical oxygen demand) gradually decreases during the oxic phase. In one embodiment, the end of the oxic phase is determined when the soluble phosphate concentration and the soluble ammonia concentration reach around 0 mg/L (the "oxic phase endpoints" illustrated as $OE_1$ and $OE_2$ in FIG. 2).

The oxic phase lasts for a duration of time necessary to achieve an oxic phase ending criterion (as discussed below), which may be the attainment of the oxic phase endpoints. The oxic phase endpoints are ammonia and phosphate concentration at substantially 0 mg/L. In one embodiment, an oxic phase ending criterion is achieved from 30 minutes to 6 hours after the initiation of the oxic phase. In certain instances when the biological load of the reactor volume is particularly high, the oxic phase endpoint may be achieved from 10 to 12 hours after the initiation of the oxic phase. The length of the oxic phase may be controlled and monitored as described later in this specification. During the oxic phase, the DO content of the reactor volume is monitored and controlled to supply sufficient supply of DO to the bacterial in the reactor volume. The control and monitoring system that may be employed with the CSR system of the present disclosure may control the number of blowers that are on at any given time during the oxic phase to ensure that the DO levels are maintained at an optimal level. This control saves on the energy costs of the system, while maintaining optimal biological performance.

Anoxic Phase

The beginning of the anoxic phase follows the completion of the oxic phase. Once the oxic phase is determined to be completed (as discussed above), the blowers are turned off and the oxygen supply to the reactor volume is discontinued.

As a result, the free oxygen in the reactor volume is depleted over time and the reactor volume experiences a limited oxygen environment. As in the oxic phase, the entire reactor volume experiences the anoxic phase at the same time. The anoxic phase is characterized by the denitrification process; that is the bacterial consumption of nitrates. During the denitrification process, the oxygen released is used for bacterial respiration and the $N_2$, as a gas, is released into the atmosphere. As the nitrates are consumed during bacterial respiration, the de-nitrification process occurs.

During the anoxic phase, the DO content reaches substantially 0 mg/L and the BOD gradually increases during the duration of the anoxic phase. Furthermore, both the soluble ammonia concentration and the soluble phosphate concentration increase, with the increase in the soluble ammonia concentration increasing more dramatically. Importantly, the soluble nitrate concentration decreases from a plateau at the beginning of the anoxic phase to a concentration of around 0 m/L at the end of the anoxic phase as a result of the denitrification process. The anoxic phase is determined to be completed when the soluble nitrate concentration reaches substantially 0 mg/L (referred to as the "anoxic phase endpoint" illustrated as XE in FIG. 2).

In any given sequence, the duration of the anoxic phase is generally shorter than the oxic phase. The anoxic phase lasts for a duration of time necessary to achieve an anoxic phase ending criterion (as discussed below), which may be the attainment of the anoxic phase endpoint. In one embodiment, the anoxic phase ending criterion is achieved from 20 minutes to about 2 hours after the initiation of the anoxic phase. In certain situations the anoxic phase endpoint is achieved up to 4 hours after the initiation of the anoxic phase.

Anaerobic Phase

After the completion of the anoxic phase (as defined above), the anaerobic phase begins. The blowers remain off during the anaerobic phase. As in the previous two phases, the entire reactor volume experiences the anaerobic phase at the same time. However, during the anaerobic phase, there is substantially no oxygen (an oxygen free or oxygen starved environment) available for bacterial respiration (the DO and the soluble nitrates reach a concentration of substantially 0 mg/L during the anoxic phase). The reactor volume is in oxygen starved state during the anaerobic phase.

During the anaerobic phase, as influent continues to flow into the basin, BOD continues to climb, representing the increasing stress placed on the bacteria in the MLSS. The soluble ammonia and soluble phosphate concentrations continue to rise during the anaerobic phase. The soluble nitrate and the DO concentrations remain at substantially 0 mg/L. The soluble ammonia concentration increases as the anaerobic phase continues. The anaerobic phase is determined to be completed when the soluble phosphate concentration increases at the desired rate (see discussion below) (the "anaerobic phase endpoint" illustrated as BE in FIG. 2).

Many prior art biological nutrient removal systems incorporate only an oxic and an anoxic phase (omitting the anaerobic phase). However, the anaerobic phase is an important component of the CSR system with regard to enhanced phosphorous removal. Phosphorous is a common pollutant in wastewater and other liquid wastes. The removal of phosphates from such sources is often mandated by local and/or federal environmental regulations. The conventional wastewater treatment methods (incorporating oxic and anoxic phases only) remove little phosphate via biological processes. The phosphates that are removed are primarily incorporated into the tissue of the bacteria comprising the MLSS. While chemicals (such as metal salts) may be used to chemically precipitate the soluble phosphates, chemical treatments result in increased costs and increased sludge production making chemical processes less attractive. During the anaerobic phase, soluble phosphate (in the form of orthophosphate) is released into the reactor volume, resulting in an increase in soluble phosphate concentration. The additional soluble phosphate released during the anaerobic phase is taken up by the bacteria in the MLSS during the oxic phase at a rate 2-5 times greater than in a biological nutrient removal system that does not incorporate an anaerobic phase. This enhanced removal of soluble phosphate is termed luxury phosphate uptake and requires both an oxic and an anaerobic phase. While soluble phosphate is released during the anaerobic phase, more soluble phosphate is removed by the bacterial mass in the MLSS during the oxic phase, resulting in a net removal of soluble phosphate from the reactor volume.

In addition, the anaerobic phase acts as a microbial selector over time favoring those populations of bacteria that store excess quantities of soluble phosphate. Therefore, over time the soluble phosphate removal capacity of the bacteria in the MLSS will increase. Furthermore, the anaerobic phase selects against the growth of most filamentous microorganisms resulting in the formation of flocculating bacteria which improves sedimentation, clarification and dewatering In any given sequence, the duration of the anaerobic phase is generally the shortest. The anaerobic phase lasts for a duration of time necessary an anoxic phase ending criterion (as discussed below), which may be the attainment to achieve an anaerobic phase ending criterion, which may be the attainment of an anaerobic phase endpoint to be reached. In one embodiment, the anaerobic phase ending criterion is achieved from about 5 minutes to about 45 minutes after the initiation of the anaerobic phase. In certain situations the anaerobic phase endpoint is achieved up to 1.5 hours after the initiation of the anaerobic phase.

During the three phases discussed above, the bacteria in the activated sludge remain constant. The bacteria remain aerobic during all three stages, however during the anaerobic phase the bacteria become highly stressed; the bacteria do not convert to an anaerobic state (such as the case may be with facultative aerobic bacteria).

Control System and Modes of Operation

The CSR system described above is optimized by a process control system. The basic concept of the CSR is to create 3 process phases (oxic, anoxic and anaerobic) to facilitate biological nutrient removal from a liquid to be treated in a single basin by continuously sequencing the phases in a sequential order. Since the CSR system operates in a single basin, a process control system may be used to maximize the functioning of the CSR to determine when a given phase is complete (or driven to biological completion) and therefore, the next phase should begin. The process control system has been described above. The goal of the process control system is to optimize the CSR process. In one embodiment, the CSR process is operating under optimal conditions when the time required to complete a sequence (oxic, anoxic and anaerobic phases) is minimized while at the same time achieving the biological objectives of each phase of the sequence. In order to achieve this optimization, the process control system's goals include, but are not limited to: (i) maximizing the biological treatment of the wastewater or other liquid to be treated by enhancing the naturally occurring biological removal of pollutants; (ii) minimizing the use of chemical additives in the process, which add costs and increase waste products; (iii) minimize the amount of money to operate the CSR system; and (iv) minimize the chemically generated solids produced during the CSR process.

The process control system may incorporate a variety of control and monitoring systems of varying complexity. For example, in one embodiment, the process control system incorporates a system to monitor DO content with a series of timers to control the blowers that deliver the air (with its oxygen) to the reactor volume at desired times (referred to herein as "secondary mode"). In an alternate embodiment, the process control system may incorporate an online, real-time monitoring and analysis system that monitors at least one desired biological parameter selected from the following: soluble ammonia concentration, soluble nitrate concentration, soluble phosphate concentration, and/or DO (referred to herein as "primary mode"). The various process control systems will be described in more detail below.

In the discussion that follows, timers may include any device that is capable of monitoring time and communicating this information to the process control system. The timer may be a integrated component of the controller 100 or may be a device external to the controller 100. Furthermore, each of the timers referred to herein may be a single timer, or each timer may be a distinct timer. Furthermore, certain timers may be combined into a single timer while certain timers may be distinct timers. For the sake of clarity, the phrase "a timer in communication with a processor" or the like includes a timer that is part of said processor.

The above discussion of the oxic, anoxic and anaerobic phases pointed out that each of the phases of the CSR could be associated with a biological process occurring in that phase and that the completion of each phase could be determined by analyzing a phase endpoint associated the completion of the phase. Table I lists the various phase endpoints associated with each phase and an exemplary biological process occurring during that phase. The phase endpoints are associated with various nutrient levels in the particular phase of interest. The analyzing may include simply determining the concentration of a biological nutrient and determine that a phase is completed when the concentration of one or more biological nutrients falls within a set range. Alternatively, the analyzing step may include determining the rate of change of the concentration of a biological nutrient over time, with a pattern of the rate of change signaling the completion of the phase. In addition, both methods may be used in combination if desired.

In addition to determining when a given phase is completed, the analyzing step may also determine if additional steps are required in order to drive the biological process occurring in a given phase to biological completion. For example, the present disclosure contemplates the addition of a chemical additive, such as but not limited to a metal salt and a carbon source, to the reactor volume under certain conditions in order to drive the appropriate biological process to biological completion. For example, as will be described in more detail herein, the addition of a carbon source (such as but not limited to acetic acid) during the anoxic phase can be used to increase the rate of the denitrification process (removal of soluble nitrates from the reactor volume) if it is determined that the process is not occurring at an desired or optimal rate.

Primary Mode

The primary mode of the process control system offers the maximum amount of monitoring and process control. Therefore, operating the CSR in primary mode generally results in the highest level of treatment (i.e. removal of pollutants) for the wastewater or other liquid to be treated. The primary mode operation continuously monitors the concentration of soluble ammonia ($NH_4$), phosphate ($PO_4$) and nitrates ($NO_x$) in the reactor volume through a series of analyzers. As the concentrations are monitored, the information is transferred to the process control system and the process control system determines when a particular phase endpoint has been reached by comparing the data being received to a pre-determined value or set of values. The comparison step may be performed manually or automatically.

Any analyzers may be used that is capable of measuring soluble ammonia, phosphate and nitrates. A separate analyzer may be used to monitor each of the above mentioned components, or the same analyzer may measure more than one or all of the above mentioned components. The output of the analyzer may be any output selected by the user, however, for the purposes of the present discussion the output is of the analyzers is stated in mg/L. The analyzers are in communication with the process control system so that the information obtained may be analyzed by the process control system. The primary mode also comprises an additive dosing system for adding additional materials to the reactor volume if required. In one embodiment, the additional materials include, but are not limited to, a carbon source and a metals salt. Furthermore, the primary mode comprises an analyzer to monitor the concentration of DO.

As discussed above, each of the phases of the CSR has one or more significant nutrient levels associated with it. For the oxic phase, the ammonia and phosphate levels are key to monitoring the biological completion of the oxic phase. The oxic phase endpoints are met when the concentration of soluble ammonia and phosphate reach substantially 0 mg/L. As shown in FIG. 2, the oxic phase endpoints are illustrated as occurring at the same time during the oxic phase. In reality, this generally will not be the case and is not required.

During the oxic phase, the controlling analyzers are the ammonia and phosphate analyzers and the DO analyzer. The ammonia and phosphate analyzers are used to determine if/when the oxic phase endpoints have been met, while the DO analyzer is used to optimize the DO concentration in the reactor volume and the MLSS by determining the number of blowers to place in operation. In one embodiment, DO concentrations are maintained with the range of 0.5 to 3 mg/L. With more blowers in operation, the more air is introduced into the reactor volume and the MLSS, the higher the DO concentration. For example, assume the process control system is set-up to maintain the DO concentration during the oxic phase between 0.5 and 1.5 mg/L. If the DO analyzer detects a DO concentration of 1.7 mg/L, then this information is transferred to the process control system which turns at least a blower off. If the DO level is still above the upper limit of 1.5 mg/L a predetermined period of time later (defined as $T_{SD}$ for time staging delay) as determined by the DO analyzer, the process control system turns another blower off. Likewise, if the DO concentration is determined to be 0.3 mg/L as determined by the DO analyzer, then this information is transferred to the process control system which turns a blower on. If the DO concentration is still below the lower limit of 0.5 mg/L a predetermined period of time later ($T_{SD}$) as determined by the DO analyzer, the process control system turns another blower on. This process continues until the DO level is within the predetermined range. The time interval between turning two consecutive blowers off/on ($T_{SD}$) may be preset into the logic of the process control system or may be controlled by a series of timers. In one embodiment $T_{SD}$ ranges from 1 to 5 minutes. Such a mechanism allows the biological processes occurring in the reactor volume a chance to respond to the change in DO levels and prevents the blowers from turning off/on too frequently.

In addition to the monitoring of the ammonia, phosphate and nitrate concentrations and the DO concentrations, the process control system also employs a series of "watchdog timers" to ensure that the oxic phase lasts for a least a certain period of time ($T_{Omin}$, for time oxic minimum) and does not extend beyond a certain period of time ($T_{Omax}$, for time oxic maximum). The watchdog timers, which can be manual timers, are programmed into the logic of the process control system. The $T_{Omin}$ and $T_{Omax}$ may be set at any values desired. However, in one embodiment, $T_{Omin}$ is 30 minutes and $T_{Omax}$ is 12 hours. In an alternate embodiment, $T_{Omin}$ is 30 minutes and $T_{Omax}$ is 4 hours.

For example, if the ammonia and phosphate analyzers have determined that the soluble ammonia and phosphate concentrations are substantially 0 mg/L at 25 minutes from the initiation of the oxic phase, this information is transmitted to the process control system which would then turn off all blowers in order to initiate the anoxic phase of the sequence. However, if $T_{Omin}$ has been set to 30 minutes from the initiation of the oxic phase the watchdog timer prevents the process control system from shutting down the blowers and prevents entry into the anoxic phase until the condition of $T_{Omin}$ has been met. As a further example, if the ammonia and phosphate analyzers would have determined that the soluble ammonia and phosphate concentrations were 1.5 and 1.0 mg/L respectively, at 4 hours and 5 minutes after the initiation of the oxic phase, this information when transmitted to the process control system would continue to hold the CSR in the oxic phase. However, if $T_{Omax}$ was set to 4 hours, the process control system is overridden by the $T_{Omax}$ watchdog timer and the blowers are shut off in order to force the process into the anoxic phase even though the oxic phase endpoints were never reached.

Therefore, the oxic phase continues until one of the oxic phase ending criteria have been met. The oxic phase ending criteria are satisfied when one of the following events occurs: (i) each of the oxic phase endpoints have been met and the $T_{Omin}$ has been satisfied; (ii) the maximum time limit, $T_{Omax}$, expires; or (iii) the oxic phase preemptive end criterion has been met (discussed below).

Once an oxic phase ending criterion has been met, the process control system shuts of the blowers, thereby eliminating the supply of oxygen to the reactor volume and the MLSS, thereby initiating the anoxic phase. As a result, the DO concentration rapidly decreases and the denitrification process beings as the bacteria in the MLSS utilize the soluble nitrates produced during the nitrification process in the oxic phase for respiration. The anoxic phase endpoint is reached when the soluble nitrate concentration reaches substantially 0 mg/L as measured by the $NO_X$ analyzer. The anoxic phase endpoint is designated XE (for anoxic ending). Therefore, during the anoxic phase, the $NO_X$ analyzer is the controlling analyzer.

As described for the oxic phase above, the process control system also incorporates a series of watchdog timers for the anoxic phase to ensure that the anoxic phase lasts for at least a certain period of time ($T_{Xmin}$, for time anoxic minimum) and does not extend beyond a certain period of time ($T_{Xmax}$, for time anoxic maximum). The watchdog timers for the anoxic phase function in the manner described for the watchdog timers in the oxic phase. The $T_{Xmin}$ and $T_{Xmax}$ may be set at any values desired. However, in one embodiment, $T_{Xmin}$ is 20 minutes and $T_{Xmax}$ is 4 hours. In an alternate embodiment, $T_{Xmin}$ is 20 minutes and $T_{Xmax}$ is 2 hours.

For example, if the $NO_X$ analyzer has determined that the soluble nitrate concentration is substantially 0 mg/L at 15 minutes after the initiation of the anoxic phase, this information is transmitted to the process control system which would normally initiate the anaerobic phase of the sequence. However, if $T_{Xmin}$ has been set to 20 minutes from the initiation of the anoxic phase the watchdog timer prevents the process control system from entry into the anaerobic phase until the condition of $T_{Xmin}$ has been met. As a further example, if the $NO_X$ analyzer has determined that the soluble nitrate concentration is substantially 1.5 mg/L at 2 hours and 5 minutes after the initiation of the anoxic phase, this information is transmitted to the process control system which would normally continue to hold the CSR in the anoxic phase. However, if $T_{Xmax}$ is set to 2 hours, the process control system is overridden by the $T_{Xmax}$ watchdog timer and the anaerobic phase is entered even though the anoxic phase endpoint was never achieved.

Therefore, the anoxic phase continues until one of the anoxic phase ending criteria have been met. The anoxic phase ending criteria are satisfied when one of the following events occurs: (i) the anoxic phase endpoint has been satisfied and the $T_{Xmin}$ has been satisfied; (ii) the maximum time limit, $T_{Xmax}$ expires; or the anoxic phase preemptive end criterion has been met (discussed below).

Once an anoxic phase ending criterion has been met, the process control system initiates the anaerobic phase. During the anaerobic phase, the blowers are maintained in the off state. In contrast to the anoxic phase where DO concentration decreased during the anoxic phase, the DO concentration is at and remains at substantially 0 mg/L during the anaerobic phase. Likewise the soluble nitrate concentration begins the anaerobic phase at substantially 0 mg/L in the anaerobic phase in contrast to the anoxic phase where the soluble nitrate concentration is at a peak value at the beginning of the anoxic phase. The anaerobic phase endpoint is reached when soluble phosphate release is maximized. The anaerobic phase endpoint is designated BE in FIG. 2 and FIG. 3 (for anaeroBic ending). During the anaerobic phase the controlling analyzer is the phosphate analyzer. In one embodiment, the anaerobic phase endpoint is determined not simply be reaching a certain concentration value as in the oxic and anoxic phases, but rather by determining the rate of change, or the reaction rate, of phosphate release. In an alternate embodiment, the anaerobic phase endpoint may be determined by simply reaching a certain concentration value. In a further alternate embodiment, both a rate of change and a concentration value must be met to satisfy the anaerobic phase endpoint.

The rate of change may be determined from the slope of the phosphate concentration curve over time. For example, if the concentration curve (and therefore the slope) is steep, the concentration is changing rapidly and the rate of change is high. The opposite is true of a flat concentration curve. FIG. 3 represents an exemplary phosphate concentration curve. For the purpose of the CSR method, the rate of inflow into the reactor basin is small in comparison to the total volume of the reactor basin; therefore, the contribution of the inflow to the reactor basin can be ignored.

As illustrated in FIG. 3, the soluble phosphate concentration is initially low at the beginning of the anaerobic phase. As the anaerobic phase continues, the rate of formation of phosphorous begins to increase, as indicated by the increasing slope of the concentration curve. As the anaerobic phase continues, the rate of formation of phosphorous begins to flatten out, as indicated by the decreasing slope of the concentration curve. If the anaerobic phase continued for a longer period of time, the concentration curve would become essentially a flat line, indicating that the bacteria in the reactor volume and the MLSS have released all the phosphate they are capable of releasing. The phosphate analyzer monitors the phosphate concentrations and transmits the concentration values to the process control system which records the time at which each value is recorded. The process control system calculates the rate of change in the phosphate concentration (i.e. the rate of formation of phosphate). When the rate of formation of phosphate approaches the target value the process control system determines that the anaerobic phase of the sequence is at an end since the anaerobic phase endpoint has been achieved. In one embodiment, the target value is substantially 0 mg/L per time unit (such as an hour), for example 0.15 mg/L per hour. However, it is to be understood that other target values may be used as would be known to one of ordinary skill in the art.

In one embodiment, the process control system does not begin to calculate the rate of formation of phosphate until a predetermined time interval, referred to as $T_{Bmin}$ (for time anaerobic minimum) has been achieved. Since the concentration of phosphate is minimal at the beginning of the anaerobic phase and the phosphate concentration increases rapidly as the anaerobic phase continues, commencing the measurements of the rate of formation of phosphate too early may provide a false reading in that the rate of formation of phosphate would be determined to reach the target value before the bacteria in the MLSS were able to begin the phosphate release, resulting in a premature termination of the anaerobic phase and incomplete phosphate release. Therefore, $T_{Bmin}$ serves as a watchdog timer for the anaerobic phase. An additional watchdog timer ensures that the anaerobic phase does not extend beyond a maximum period of time ($T_{Bmax}$, for time anaerobic maximum). The watchdog timers for the anaerobic phase function in the manner described for the watchdog timers in the oxic phase. The $T_{Bmin}$ and $T_{Bmax}$ may be set at any values desired. However, in one embodiment, $T_{Bmin}$ is 5 minutes and $T_{Bmax}$ is 1.5 hours.

For example, if the phosphate analyzer has determined that the rate of formation of phosphate is at the target value (in this example substantially 0 mg/L per hour) at 3 minutes after the initiation of the anaerobic phase, this information is transmitted to the process control system which would normally initiate the oxic phase of a new sequence. However, if since $T_{Bmin}$ has been set to 5 minutes (i.e. 5 minutes after the initiation of the anaerobic phase) the watchdog timer prevents the process control system from moving into the oxic phase of the next sequence until the condition of $T_{Bmin}$ has been met. As a further example, if the phosphate analyzer has determined that the rate of formation of phosphate has not reached the target value (in this example substantially 0 mg/L per hour) at 1.5 hours and 5 minutes after the initiation of the anoxic phase, this information is transmitted to the process control system which would normally continue to hold the CSR in the anaerobic phase. However, if $T_{Bmax}$ is set to 1.5 hours, the process control system is overridden by the $T_{Bmax}$ watchdog timer and the oxic phase of the next sequence is initiated even though the anaerobic phase endpoint was never achieved.

Therefore, the anaerobic phase will continue until one of the anaerobic phase ending criteria have been met. The anaerobic phase ending criteria are satisfied when one of the following events occurs: (i) the anaerobic phase endpoint has been satisfied and the $T_{Bmin}$ has been satisfied; (ii) the maximum time limit, $T_{Bmax}$ expires; or (iii) one of the anaerobic phase preemptive end criteria have been met (discussed below).

Once an anaerobic phase ending criteria has been met, the process control system initiates the oxic phase of the next sequence and the process starts again.

Additional Control Parameters in Primary Mode

In addition to the monitoring and control processes described above, the process control system also monitors the CSR system to determine if the CSR system is behaving within a defined set of parameters. When the process control system determines that the CSR system is behaving outside of normal parameters, several corrective actions may be taken. These actions include but are not limited to (i) initiating a preemptive end to a particular phase or (ii) initiating the addition of a chemical modifier to the system at a particular point in a given phase. The preemptive end actions will be described first, followed by the addition of chemical modifiers.

With regard to the oxic phase, this phase is characterized by the nitrification process, that is the conversion of the pollutant ammonia, in combination with DO, to nitrates and water and the enhanced uptake of phosphate by the bacteria in the reactor volume and the MLSS. As a result, the nitrate concentration during the oxic phase rises. There is the potential that the nitrate concentration could reach a level that may impact the efficient operation of the CSR system. As discussed above, the ammonia, nitrate and phosphate analyzer are monitoring the concentrations of ammonia, nitrate and phosphorous and transmits this information to the process control system. If the process control system determines that the nitrate concentration reaches a value referred to as the nitrate high set point, or $N_H$, the process control system immediately ends the oxic phase by turning all blowers off, forcing the CSR system into the anoxic phase where the denitrification process occurs, thereby reducing the nitrate concentration to allowable values. The $N_H$ can be set to any value desired, but in one embodiment, $N_H$ is from about 5 to 10 mg/L.

The oxic phase preemptive end is indicated in FIG. 2. As illustrated, the preemptive end criterion for the oxic phase is a high nitrate concentration, which is illustrated by a starburst symbol in FIG. 2. The arrow attached to the starburst symbol indicates that the CSR system is shifted into the anoxic phase as a result of the oxic phase preemptive end.

With regard to the anoxic phase, this phase is characterized by the denitrification process, that is the consumption of the nitrates for energy consumption. As a result, the nitrate concentration during the anoxic phase falls and the concentration of ammonia increases. There is the potential that the ammonia concentration could reach a level that may impact the efficient operation of the CSR system. The ammonia, nitrate and phosphate analyzer are monitoring the concentrations of ammonia, nitrate and phosphorous and transmits this information to the process control system. If the process control system determines that the ammonia concentration reaches a value referred to as the ammonia high set point, or $A_H$, the process control system immediately ends the anoxic phase and initiates the beginning of the oxic phase by turning on the blowers to increase the DO concentration in the reactor volume and the MLSS. As discussed during the oxic phase, ammonia is consumed as a result of the nitrification process, thereby reducing the ammonia concentration to allowable values. The $A_H$ can be set to any value desired, but in one embodiment, $A_H$ is from about 3 to 7 mg/L.

The anoxic phase preemptive end is indicated in FIG. 2. As illustrated, the preemptive end criterion for the anoxic phase is a high ammonia concentration, which is illustrated by a starburst symbol in the ammonia graph in FIG. 2. The arrow attached to the starburst symbol indicates that the CSR system is shifted into the oxic phase as a result of the anoxic phase preemptive end.

With regard to the anaerobic phase, this phase is characterized by the non-aeration process, that is the maintenance of the reactor volume and the MLSS in a state where the DO is substantially 0 mg/L. During the anaerobic phase, the ammonia concentrations continue the rise started in the anoxic phase and the phosphate concentrations begin to rise. There is the potential that the ammonia concentration and/or the phosphate concentration could reach a level that may impact the efficient operation of the CSR system. The ammonia, nitrate and phosphate analyzer are monitoring the concentrations of ammonia, nitrate and phosphorous and transmits this information to the process control system. If the process control system determines that the ammonia concentration reaches a value referred to as the ammonia high set point, or $A_H$, or that the phosphate concentration reaches a value referred to as the phosphate high set point, or $P_H$, the process control system immediately ends the anaerobic phase and initiates the beginning of the oxic phase by turning on the blowers to increase the DO concentration in the reactor volume and the MLSS. As discussed during the oxic phase, ammonia is consumed as a result of the nitrification process and phosphate is taken up by the bacteria in the reactor volume and the MLSS, thereby reducing the ammonia concentration to allowable values. The $A_H$ and $P_H$ can be set to any value desired, but in one embodiment, $A_H$ is from about 3 to 7 mg/L and $P_H$ is from about 1 to about 3 mg/L.

The anaerobic phase preemptive ends are indicated in FIG. 2. As illustrated, the preemptive end criterion for the anaerobic phase is a high ammonia concentration and/or high phosphate concentration, which is illustrated by a starburst symbol in the ammonia graph and the phosphate graph in FIG. 2. The arrow attached to the starburst symbols indicate that the CSR system is shifted into the oxic phase as a result of the anaerobic phase preemptive end.

In addition, the CSR system is equipped with the ability to add selected chemical additives to the reactor basin on the occurrence of specified events in order to drive a particular biological process to biological completion and/or to correct an imbalance in the CSR process. In one embodiment, the chemical additives include metal salts and a carbon source. The chemical additives may be added as is known in the art. In one embodiment a standard pump is used to add the chemical additives. Other methods of addition may also be used. The addition of the desired chemical additive may be selected using a preset approach or a rate based approach. The concept and timing of chemical additive dosing is illustrated in FIG. 4.

In the preset approach, the quantity of the desired chemical additive added to the reactor volume is selected by the operator of the CSR system and therefore the quantity of the chemical additive does not depend on any measurement of a CSR parameter (such as ammonia, nitrate, phosphate or DO concentrations). The desired chemical additive may be added at substantially one time, or over a period of time as desired by the operator. In one embodiment, the addition of a carbon source is determined by a preset approach. $CS_O$ indicates that the carbon source chemical additive is released via a preset approach. Likewise, the representation $MS_O$ indicates the metal salt chemical additive is released by a preset approach.

In the rate based approach, the quantity of a desired chemical additive added to the reactor volume is determined according to a measurement of a CSR parameter. The measurement of the CSR parameter may either be a simple concentration measurement or a rate of change measurement or a combination of both. In one embodiment, the addition of metal salts is determined by a rate based approach. The representation $MS_R$ (for metal salt, rate release) indicated that the metal salt chemical additive is released via a rate based approach. Likewise, the representation CSR (for carbon source, rate release) indicated that the carbon source is released via a rate based approach.

During the oxic phase, it may be desirable to add a metal salt chemical additive to decrease phosphorous concentrations (i.e. to drive the phosphorous levels to substantially 0 mg/L as required for entry into the anoxic phase). The addition of metal salts is designated by the solid funnel shown in the oxic phase of the phosphate concentration graph in FIG. 4. Metal salts include, but are not limited to ferric chloride, ferrous chlorites and aluminum chloride. The metal salts bind to the soluble phosphorous in solution and precipitate the free phosphate from the reactor volume, thereby decreasing the phosphate concentration. While the use of the metal salt chemical additive may have certain undesirable aspects (such as increased costs of operation and increased solid waste generation), the method can be an effective means to lower phosphate concentration. As discussed, the phosphate concentration decreases during the oxic phase as a result of enhanced phosphorous uptake by the bacteria present in the reactor volume and the MLSS. After an initial phosphate period of uptake (in one embodiment 45-60 minutes) the bacteria are not capable of further significant phosphorous uptake. The phosphate analyzers monitor the real time decrease in phosphate concentration in the reactor volume and transmit this information to the process control system. The process control system determines the actual rate of phosphate elimination ($P_e$). The process control system then makes a determination whether the actual rate of phosphate elimination will be sufficient to reduce the phosphate concentration to substantially 0 mg/L before the end of the oxic phase (the maximum time for the oxic phase is defined by $T_{Omax}$). If the actual rate of phosphate elimination is sufficient to drive the phosphate concentration to substantially 0 mg/L by the end of the oxic phase, metal salts are not added. However, if the actual rate of phosphate elimination is not sufficient to drive the phosphate concentration to substantially 0 mg/L before the end of the oxic phase, the process control system initiates the addition of the metal salt chemical additive.

The addition of the metal salt chemical additive should be used only when required to drive the phosphate concentration to substantially 0 mg/L. The use of the metal salt will increase the costs of operation due to the costs of the metal salts themselves and due to the increased generation of solid waste which must be periodically removed from the reactor basin and disposed of. Therefore, the use of the metal salt chemical additive should be strictly limited to those situations in which its use is required, and when used, the minimum amount of metal salts should be added.

In order to allow the process control system to determine if the actual rate of phosphate elimination, $P_e$, is sufficient to reduce the phosphate concentration to substantially 0 mg/L by the end of the oxic phase, a phosphate target elimination rate ($P_E$) is established. The target phosphate elimination rate may be set as desired by the operator. In one embodiment, the target rate of phosphate elimination is from 0.15 mg/L per hour to 0.3 mg/L per hour. In the description below, a target rate of phosphate elimination of 0.2 mg/L per hour is used. If during the oxic phase the process control system determines that the actual rate of phosphate elimination ($P_e$) is 0.1 mg/L per hour then the actual rate of phosphate elimination is less that the target rate of phosphate elimination ($P_E$), ($P_e<P_E$) then the process control system makes a determination that the actual rate of phosphate elimination is not sufficient to drive the phosphate concentration to substantially 0 mg/L by the end of the oxic phase and initiates a release of the metal salt chemical additive. In order to allow the bacteria sufficient time to begin the uptake of the phosphate in the reactor volume (and therefore create a realistic actual rate of phosphate elimination) the comparison of the actual and target rates of phosphate elimination is not initiated until a predetermined period has expired. This period is referred to as the dosing delay period. The period may be monitored with a timer ($T_{DD}$, for timer dosing delay). On expiration of the dosing delay period, the process control system compares the actual and target rates of phosphate elimination as described herein. The time period in which dosing may occur extends from the end of the dosing delay period to the end of the oxic phase and is represented by the time period $T_{DR}$ (for time period for metal salt dosing during oxic phase).

The metal salt chemical additive is released in the smallest quantity possible. To accomplish this goal a predetermined amount of metal salts are introduced into the reactor volume, such as by a pump which introduces a liquid solution of metal salts into the reactor volume. In one embodiment, the predetermined amount of metal salt is determined by the difference between the actual rate of phosphate elimination and the target rate of phosphate elimination. If the difference is large, a larger amount of metal salt is added. If the difference is small, a smaller amount of metal salts are added. In this case the pump operates for a time ($MS_{PT}$, for metal salt pump time) sufficient to deliver the predetermined amount of metal salt and then is signaled by the process control system to discontinue the introduction of metal salt into the basin. The metal salts could be delivered in solid form as well without the use of a pump as is known in the art such as using a batch release delivery. On addition of the first dose of metal salts, a chemical reaction delay time ($CRT_M$, for chemical reaction delay time metal salts) is initiated by the process control system which prevents the further addition of metal salts until the $CRT_M$ has expired. This allows the metal salts sufficient time to increase the actual rate of phosphate elimination so that it meets or exceeds the target rate of phosphate elimination. By allowing sufficient time for the metal salts to enhance the actual rate of phosphate elimination, the amount of metal salts used can be minimized. Following the end of the $CRT_M$, the process control system resumes the comparison of the actual and target rates of phosphate elimination and makes further decisions on the dosing of metal salts as described above.

In addition to the rate based approach above, a pre-determined amount of the metal salt may be added to the reactor volume based on the absolute concentration of phosphate determined by the phosphate analyzer. The operator would make a determination based on his experience whether the perceived rate of phosphate elimination would be sufficient to drive the phosphate concentration to substantially 0 mg/L by the end of the oxic phase. If the operator determined that this was not the case, the operator could initiate the addition of the metal salt to the reactor basin to drive the reaction to completion. In the alternative a preset amount of the metal salt could be added at a selected time during the oxic phase.

During the anoxic phase, it may be desirable to add a carbon source chemical additive to decrease nitrate concentrations (i.e. to drive the nitrate levels to substantially 0 mg/L as required for entry into the anaerobic phase). The addition of the carbon source in the anaerobic phase is designated by the cross hatched funnel in FIG. 4. The carbon source includes, but are not limited to acetic acid, methanol, primary sludge and volatile fatty acids. While the use of the carbon source chemical additive may have certain undesirable aspects (such as increased costs of operation and increased solid waste generation), the method can be an effective means to lower nitrate concentration. The nitrate analyzers monitor the real time decrease in nitrate concentration in the reactor volume and transmit this information to the process control system. The process control system determines the actual rate of nitrate elimination ($N_e$) The process control system then makes a determination whether the actual rate of nitrate elimination will be sufficient to reduce the nitrate concentration to substantially 0 mg/L before the anoxic phase will end (the maximum time for the anoxic phase is defined by $T_{Xmax}$). If the actual rate of nitrate elimination is sufficient to drive the nitrate concentration to substantially 0 mg/L by the end of the anoxic phase, the carbon source is not added. However, if the rate of nitrate elimination is not sufficient to drive the nitrate concentration to substantially 0 mg/L before the end of the anoxic phase the process control system initiates the addition of the carbon source chemical additive.

The addition of the carbon chemical additive should be used only when required to drive the nitrate concentration to substantially 0 mg/L. The use of the carbon source will increase the costs of operation as discussed above. Therefore, the use of the carbon source chemical additive should be strictly limited to those situations in which its use is required, and when used, the minimum amount of the carbon source should be added.

In order to allow the process control system to determine if the actual rate of nitrate elimination, $N_e$, is sufficient to reduce the nitrate concentration to substantially 0 mg/L by the end of the anoxic phase, a nitrate target elimination rate ($N_E$) is established. The target nitrate elimination rate may be set as desired by the operator. In one embodiment, the target rate of nitrate elimination is from 0.2 to 0.5 mg/L per hour. In the description below, a target rate of nitrate elimination of 0.3 mg/L per hour is used. If during the anoxic phase the process control system determines that the actual rate of nitrate elimination ($N_e$™) is 0.1 mg/L per hour then the actual rate of nitrate elimination is less that the target rate of nitrate elimination ($N_E$), ($N_e < N_E$) the process control system makes a determination that the actual rate of nitrate elimination is not sufficient to drive the nitrate concentration to substantially 0 mg/L by the end of the anoxic phase and initiates a release of the carbon source chemical additive. The carbon source may be added to the reactor volume at any point during the anoxic phase and is represented by the time period $T_{CX}$ (for time period for carbon source dosing during anoxic phase).

The carbon source chemical additive is released in the smallest quantity possible. To accomplish this goal a predetermined amount of the carbon source is introduced into the reactor volume, such as by a pump which introduces a liquid solution of the carbon source into the reactor volume. In one embodiment, the predetermined amount of the carbon source is determined by the difference between the actual rate of nitrate elimination and the target rate of nitrate elimination. If the difference is large, a larger amount of the carbon source is added. If the difference is small, a smaller amount of the carbon source is added. In the case where a pump is used to deliver the carbon source, the pump operates for a time ($CS_{PT}$, for carbon source pump time) sufficient to deliver the predetermined amount of the carbon source and then is signaled by the process control system to discontinue the introduction of the carbon source into the basin. The carbon source could be delivered in solid form as well without the use of a pump as is known in the art. On addition of the first dose of the carbon source, a chemical reaction delay time ($CRT_C$, for chemical reaction delay time carbon source) is initiated by the process control system which prevents the further addition of the carbon source until the $CRT_C$ has expired. This allows the carbon source sufficient time to increase the actual rate of nitrate elimination so that it meets or exceeds the target rate of nitrate elimination. Following the end of the $CRT_C$, the process control system resumes the comparison of the actual and target rates of nitrate elimination and makes further decisions on the dosing of the carbon source as described above.

In addition to the rate based approach above, a pre-determined amount of the carbon source may be added to the reactor volume based on the absolute concentration of nitrate determined by the nitrate analyzer. The operator would make a determination based on his experience whether the perceived rate of nitrate elimination would be sufficient to drive the nitrate concentration to substantially 0 mg/L by the end of the anoxic phase. If the operator determined that this was not the case, the operator could initiate the addition of the carbon source to the reactor basin to drive the denitrification process to completion. In the alternative, a preset amount of the carbon source could be added at a selected time during the anoxic phase.

In addition to the dosing of the carbon source chemical additive during the anoxic phase, the carbon source may also be added during the anaerobic phase. As discussed, the biological process associated with the anaerobic phase is phosphate release by the bacteria in the reactor volume and the MLSS. Optimally, phosphate release during the anaerobic phase is achieved quickly and fully. As aerobic organisms, the bacteria in the reactor volume and the MLSS experience cellular stress when exposed to the anaerobic environment. Under such stressed conditions, the bacteria will exchange the stored phosphate for the carbon source as the carbon source is a more efficient energy yielding substrate for the bacteria.

In one embodiment, the carbon source is added during the anaerobic phase using the preset approach. Using this approach, the carbon source is added at the beginning of each anaerobic phase in every sequence during the time period $T_{CB}$ (for time period for carbon source dosing during anaerobic phase).

The addition of the carbon source in the anaerobic phase is indicated by the $CS_O$ designation. Using the preset approach for carbon dosing there is no need to determine reaction rates in the protocol. In one embodiment, where the carbon source is added by a pump, the pump initiates the addition of the carbon source and continues for a period of time ($T_{CB}$, for time carbon source dosing anaerobic phase) until the dose is delivered. In an alternate embodiment, the entire amount of the carbon source is delivered into the reactor volume using a batch release type of delivery.

In yet another alternate embodiment, a rate-based approach could be used to govern the addition of the carbon source during the anaerobic phase as was described previously for the dosing of the carbon source in the anoxic phase. However, the actual rate of phosphate release and the target rate of phosphate release would be the parameters of interest.

Secondary Mode

The secondary mode of the process control system offers an alternate method of monitoring and process control. The chemical additive dosing systems are available in the secondary mode, while the ammonia, nitrate and phosphate analyzers are not used. Operating the CSR in secondary mode does not offer the same levels of control and monitoring as operation in the primary mode, but still produces an excellent level of treatment. Since the secondary mode uses only the DO analyzer, the secondary mode of operation is an excellent choice when one of more of the latter analyzers are not in operation.

The principles of CSR operation in the secondary mode are similar to those used in the primary mode. However, where the primary mode referred to phases, the secondary mode of operation refers to stages. FIG. 5 sets forth the stages used when the CSR is operated in secondary mode. As shown in FIG. 5, the first stage is the DO start stage, which is followed by the oxic extend stage which is followed by the non-aeration stage. Each of these stages continuously sequences in the above order during operation of the CSR.

During the DO start stage and the oxic extend stage, at least some of the blowers are on and aeration is being provided to the reaction volume. During the non-aeration stage the blowers are turned off, allowing the free DO to be consumed by the bacteria in the reactor volume and the MLSS, which forces the reactor volume to experience anaerobic conditions. As under primary mode operation, the anaerobic condition stimulates phosphate release from the bacteria which is required to take advantage of the increased phosphate uptake as previously discussed.

In the secondary mode, the decision to move from one stage to the other is controlled by a preset time period regardless of the concentration of various components in the reactor volume. However, it should be noted that the DO start stage may be terminated based on the concentration of DO in the reactor volume as discussed below.

At the beginning of the DO start stage, the DO concentration in the reactor volume is substantially 0 mg/L. Therefore, the bacteria in the reactor volume and the MLSS are starved for respiratory oxygen. At the initiation of the DO start stage, the blowers are turned on by the process control system and the DO concentration starts to increase. The DO concentration is allowed to increase until the DO concentration reaches the predetermined limit $DO_H$ (for dissolved oxygen, high point). The point at which the DO concentration reaches $DO_H$ is referred to as the DO start stage control point as shown by the dashed circle in FIG. 5. The objective in the DO start stage is to increase DO concentration to the point $DO_H$. Once this objective has been met, the DO start stage is terminated and the oxic extend stage is initiated. The point $DO_H$ is set by the operator. In one embodiment, $DO_H$ is from about 0.75 to 2.0 mg/L. The raise in the DO concentration is conducive to the nitrification process which occurs in the DO start stage and the oxic extend stage.

The DO start stage may be governed by a maximum time period, $T_{DO}$. If the DO concentration is still below $DO_H$ at the end of $T_{DO}$, the process control system may terminate the DO start phase and enter the oxic extend stage. The $T_{DO}$ period guards against the possibility that $DO_H$ has been incorrectly set too high or that the DO analyzer is not functioning properly. $T_{DO}$ may be set as desired by the user. In one embodiment, $T_{DO}$ is from 60 to 120 minutes.

The oxic extend stage begins immediately after the termination of the DO start phase. One objective of the oxic extend stage is to maintain the DO concentration in a range that is conducive to the nitrification process that was initiated in the DO start stage and to continue the enhanced uptake of phosphate by the bacteria in the reactor volume and the MLSS. The DO concentration is maintained between the $DO_H$ level as discussed above and the $DO_L$ level (for dissolved oxygen low point). The $DO_L$ level is not preset by the operator. The margin of separation, $DO_A$, between $DO_H$ and $DO_L$ is set by the operator. Then the $DO_L$ is computed via the processor as: $DO_H - DO_A = DO_L$. In one embodiment, the $DO_A$ is between 0.4 and 1.5 mg/L.

The DO analyzer monitors the DO concentration and transmits this information to the process control system. The process control system turns on and off blowers to provide proper aeration to the reactor volume to maintain the DO concentration in this range (see FIG. 5). For example, if the $DO_H$ is set to 1.5 mg/L and the $DO_A$ is set for 1.0 mg/L, then the $DO_L$ is 0.5 mg/L. The DO control range setpoints then become a high of 1.5 mg/L and a low of 0.5 mg/L. The process control system turns blowers on and off to maintain the DO concentration within this range. Assume that the DO analyzer measures a DO concentration of 1.8 mg/L (above $DO_H$) and that three blowers are in operation. The process control system turns at least one blower off (Termed staging down) and takes no further action for a predetermined period of time (termed $T_{SD}$ as discussed below). At the end of $T_{SD}$, if the DO analyzer still reads a DO concentration above the $DO_H$ point, the process control system stages down at least one additional blower. The process of staging down blowers continues until the DO concentration is below $DO_H$. Likewise if the DO analyzer measures a DO concentration of 0.3 mg/L with 2 blowers on, then the process control system turns on at least one additional blower (termed staging up). The process control system takes no further action for the ensuing $T_{SD}$ period. If the DO analyzer still reports a DO concentration below $DO_L$, then at least one additional blower is staged up. The process continues until the DO concentration is above $DO_L$. In general, the range between $DO_H$ and $DO_L$ is from about 0.4 to 1.5 mg/L, although other values may be used.

The oxic extend stage continues for a predetermined amount of time, termed $T_{OE}$ (for time oxic extend stage). The $T_{OE}$ can be set as desired by the operator. In one embodiment, $T_{OE}$ is from about 30 minutes to 6 hours. When $T_{OE}$ period expires, the process control system turns off all blowers and the non-aeration stage is initiated. As discussed below, the metal salt chemical additive may be added to the reactor volume during the oxic end stage to decrease the phosphate levels if desired.

During the DO start phase and the oxic extend stage the blowers are under the control of the DO analyzer. Furthermore, an additional level of control may be provided by a delay time period, termed $T_{SD}$ (for time stage delay). The function of the $T_{SD}$ period is to provide a lag time between the start of multiple blowers. In other words, assume 2 blowers are turned on at the initiation of the DO start stage. The blowers will operate for the period $T_{SD}$ and induce aeration of the reactor volume. At the end of $T_{SD}$, the process control system will analyze the DO concentration. If the DO concentration is less than $DO_H$ then an additional blower or set of blowers will be turned on to provide additional aeration. As before, no additional blowers will be turned on to provide aeration until another $T_{SD}$ period expires. The use of the delay time results in the minimum number of blowers being in operation to achieve the desired DO concentration (such as reaching $DO_H$ or maintaining the DO concentration between $DO_H$ and $DO_L$) which saves energy and costs and also avoids the issue of sagging voltage supply which can occur when all blowers are turned on at one time.

Once the blowers are turned off, the non-aeration stage is initiated. The objectives for the non-aeration stage are to decrease the DO concentration to substantially 0 mg/L so that the denitrification process can occur. Once the blowers are turned off the DO concentration quickly declines as the remaining DO in the reactor volume is consumed by bacterial respiration. As the DO concentration decreases, the denitrification process becomes favored as the bacteria scavenge the nitrates for the oxygen content for respiration. Once the nitrates are consumed, the reactor volume is under anaerobic conditions as the DO and nitrates have been consumed. Once the DO and nitrate concentrations reach substantially 0 mg/L, they remain there throughout the non-aeration stage. As discussed in the anaerobic phase for primary mode operation, these aerobic type of bacteria are stressed by the anaerobic conditions and release phosphate into the reactor volume. The phosphate release is a component of the enhanced phosphate removal that occurs during the DO start stage and the oxic extend stage.

The non-aeration stage continues for a predetermined amount of time, termed $T_{NA}$ (for time non-aeration stage). The $T_{NA}$ can be set as desired by the operator. In one embodiment, $T_{NA}$ is from about 30 minutes to 3 hours. When $T_{NA}$ period expires, the non-aeration stage is terminated and the DO start stage of the next sequence is initiated by the process control system turning on at least one blower to provide aeration of the reactor volume. As discussed below, the carbon source chemical additive may be added to the reactor volume during the non-aeration stage to decrease the nitrate levels and increase phosphate output if desired.

In addition to the basic operation under the secondary mode described above, chemical additives may be added to the reactor volume. The chemical additives include but are not limited to a metal salt and a carbon source as described above. In secondary mode, the operator makes the decisions about chemical additive dosing and on the amount of a given chemical additive to add. There are three opportunities to dose chemical additives when the CSR is operating in the secondary mode. First, a metal salt may be added during the oxic extend stage (designated $MS_{OE}$). Second, a carbon source may be added during the early non-aeration stage (designated $CS_{ED}$). Third, a carbon source may be added during the late non-aeration stage (designated $CS_{LD}$).

The addition of a metal salt during the $MS_{OE}$ has the same purpose as described in regard to primary mode operation; that is to chemically precipitate phosphate. In combination with the enhanced uptake of phosphate by the bacteria, the biological phosphate removal is allowed to take place. The operator decides whether to initiate the dosing of metal salt by setting the variable $MS_{OE}$ in the process control system. If the operator desires to dose metal salts, the variable $MS_{OE}$ is set to a predetermined positive value (such as 1) for dosing "on" and if the operator decides not to dose metal salts the variable $MS_{OE}$ is set to a predetermined negative value (such as −1) for dosing "off". The value of the variable $MS_{OE}$ may be changed between each sequence.

The metal salt is added after a delay period, termed $T_{DM}$, which is measured from the beginning of the oxic extend stage. The delay in the addition of the metal salt allows the bacteria to remove the phosphate biologically which is the most efficient mechanism, in terms of cost, for phosphate removal. The $T_{DM}$ is set by the operator and can range from 5 to 30 minutes. If metal salt is to be added, it may be added via a pump over a period of time or via a batch mechanism. In one embodiment a pump is used to dose the metal salt. In this embodiment, the duration of the pump activation, termed $T_{Mo}$, determines the amount of metal salt added. In one embodiment about 2 to 30 lbs of metal salt is added and $T_{Mo}$ is from about 5 to 30 minutes. $T_{Mo}$ may be changed from sequence to sequence if desired.

The addition of the carbon source during $CS_{ED}$ has the same purpose as described in regard to primary mode operation; that is to aid in the elimination of nitrates from the reactor volume. The carbon source provides fuel for the bacteria to aid in the biological consumption of the nitrates. The operator decides whether to initiate the dosing of the carbon source by setting the variable $CS_{ED}$ in the process control system. If the operator desires to dose the carbon source, the variable $CS_{ED}$ is set to a predetermined positive value (such as 1) for dosing "on" and if the operator decides not to dose metal salts the variable $CS_{ED}$ is set to a predetermined negative value (such as −1) for dosing "off". The value of the variable $CS_{ED}$ may be changed between each sequence.

The carbon source is added after a delay period to allow the DO concentration to reach a very low level of about 0.1 to 0.5 mg/L (termed the $DO_{VL}$ control point) (FIG. 5). Allowing the DO concentration to reach $DO_{VL}$ increases the effect of the added carbon source. The DO analyzer measures the DO concentration and transmits this information to the process control system. When the DO concentration reaches $DO_{VL}$, the process control system initiates the dosing of the carbon source if $CS_{ED}$ is set to a positive value. If the carbon source is to be added, it may be added via a pump over a period of time or via a batch mechanism. In one embodiment a pump is used to dose the carbon source. In this embodiment, the duration of the pump activation, termed $T_{CE}$ determines the amount of the carbon source added. In one embodiment about 1 to 10 oz/min of the carbon source is added and $T_{CE}$ is from about 5 to 45 minutes. $T_{CE}$ may be changed from sequence to sequence if desired.

The addition of the carbon source during $CS_{LD}$ has the same purpose as described in regard to primary mode operation; that is to aid in the release of phosphate from the bacteria in the reactor volume and the MLSS. The operator decides whether to initiate the dosing of the carbon source by setting the variable $CS_{LD}$ in the process control system. If the operator desires to dose the carbon source, the variable $CS_{LD}$ is set to a predetermined positive value (such as 1) for dosing "on" and if the operator decides not to dose the carbon source the variable $CS_{LD}$ is set to a predetermined negative value (such as −1) for dosing "off". The value of the variable $CS_{LD}$ may be changed between each sequence.

The carbon source is added after a delay period to allow the reactor volume to be in an anaerobic state. The time variable is represented as $T_{SCL}$ (for time to start carbon source late non-aeration stage dosing). $T_{SCL}$ is computed by the formula $T_{NA}$ (for time non-aeration stage)−$T_{CL}$ (which defines the time period in which the carbon source is added during the late non-aeration stage). Therefore, the carbon source dosing during the late non-aeration stage is delayed until the end of the non-aeration stage and ensures that the reactor volume will be experiencing anaerobic conditions. The $T_{SCL}$ time period begins when the $DO_{VL}$ control point has been met as determined by the process control system. When the $T_{SCL}$ time period expires, the process control system initiates the dosing of the carbon source if $CS_{LD}$ is set to a positive value. If the carbon source is to be added, it may be added via a pump over a period of time or via a batch mechanism. In one embodiment a pump is used to dose the carbon source. In this embodiment, the duration of the pump activation, termed $T_{CL}$ determines the amount of the carbon source added. In one embodiment about 1 to 16 oz/min of the carbon source is added and $T_{CL}$ is from about 5 to 45 minutes. $T_{CL}$ may be changed from sequence to sequence if desired.

TABLE 1

|  | OXIC | ANOXIC | ANAEROBIC |
| --- | --- | --- | --- |
| Phase Endpoint | (i) Ammonia concentration = substantially 0 mg/ml (ii) Phosphorous | (i) Nitrate concentration = substantially 0 mg/ml | (i) maximum phosphate release determined by the rate of change of phosphorous |
| Biological Process | concentration = substantially 0 mg/ml Nitrification | Denitrification | concentration over time Non-aeration |
| Preemptive End | High nitrate | High ammonia | High phosphate or high ammonia |
| Controlling analyzers | Ammonia and phosphate analyzers | Nitrate analyzer | Phosphate analyzer |
| Blower Status | On under control of DO analyzer and $T_{SD}$ | Off | Off |

What is claimed is:

1. A method for automatically controlling a treatment process for a liquid, wherein said treatment process comprises subjecting said liquid to an oxic phase, an anoxic phase and an anaerobic phase in a sequential order until a desired level of treatment is achieved, said method for controlling comprising:

a. monitoring the concentration of ammonia, nitrate, phosphate and dissolved oxygen in said oxic phase with an ammonia analyzer, a nitrate analyzer, a phosphate analyzer and a dissolved oxygen analyzer, said analyzers transmitting said ammonia, phosphate and dissolved oxygen concentrations to a processor, and said processor terminating said oxic phase and initiating said anoxic phase when said processor determines an oxic phase ending criteria is met;

b. monitoring the concentration of nitrates and ammonia in the anoxic phase with a nitrate analyzer, and an ammonia analyzer, said analyzers transmitting said nitrate and ammonia concentrations to a processor and said processor terminating the anoxic phase and initiating the anaerobic phase when said processor determines an anoxic phase ending criteria is met;

c. monitoring the concentration of phosphate and ammonia in the anaerobic phase with said phosphate analyzer, and an ammonia analyzer, said analyzers transmitting said concentration to said processor, said processor calculating a rate of change of phosphate concentration and said processor terminating the anaerobic phase and initiating the oxic phase when said processor determines an anaerobic phase ending criteria is met.

2. The method of claim 1 where said oxic phase ending criteria is selected from the group consisting of: (i) an oxic phase endpoint is achieved and the minimum time period for the oxic phase has expired; (ii) the maximum time period for the oxic phase has expired; and (iii) an oxic phase preemptive end criteria is met.

3. The method of claim 2 where said oxic phase endpoint is selected from the group consisting of: (i) an ammonia concentration of substantially 0 mg/L; (ii) a soluble phosphate concentration of substantially 0 mg/L; (iii) or both an ammonia and a soluble phosphate concentration of 0 mg/L, and said oxic phase preemptive end criteria is a nitrate concentration of about 5 mg/L or greater.

4. The method of claim 2 where on the occurrence of the oxic phase preemptive end, said processor terminates the oxic phase and initiates the anoxic phase.

5. The method of claim 2 where the minimum time period and the maximum time period for the oxic phase are automatically governed using a timer in communication with said processor.

6. The method of claim 5 where the minimum time period for the oxic phase is 30 minutes and the maximum time period for the oxic phase is 12 hours.

7. The method of claim 1 where said anoxic phase ending criteria is selected from the group consisting of: (i) an anoxic phase endpoint is achieved and the minimum time period for the anoxic phase has expired; (ii) the maximum time period for the anoxic phase has expired; and (iii) an anoxic phase preemptive end criteria is met.

8. The method of claim 7 where said anoxic phase endpoint is a nitrate concentration of substantially 0 mg/L and said anoxic phase preemptive end criteria is an ammonia concentration of about 5 mg/L or greater.

9. The method of claim 7 where on the occurrence of the anoxic phase preemptive end, said processor terminates the anoxic phase and re-initiates the oxic phase.

10. The method of claim 7 where the minimum time period and the maximum time period for the anoxic phase are automatically governed using a timer in communication with said processor.

11. The method of claim 10 where the minimum time period for the oxic phase is 20 minutes and the maximum time period for the oxic phase is 4 hours.

12. The method of claim 1 where said anaerobic phase ending criteria is selected from the group consisting of: (i) an anaerobic phase endpoint is achieved and the minimum time period for the anaerobic phase has expired; (ii) the maximum time period for the anaerobic phase has expired; and (iii) an anaerobic phase preemptive end criteria is met.

13. The method of claim 12 where said anaerobic phase endpoint is a rate of change of phosphate concentration of substantially 0 mg/L per hour and said anaerobic phase preemptive end criteria is an ammonia concentration of about 5 mg/L or greater or a phosphate concentration of about 3 mg/L or greater.

14. The method of claim 13 where said rate of change of phosphate concentration is determined after a minimum time period.

15. The method of claim 14 where said minimum time period for the determination of said rate of change of phosphate concentration is automatically governed by a timer in communication with said processor.

16. The method of claim 12 where on the occurrence of the anaerobic phase preemptive end, said processor terminates the anaerobic phase and initiates the oxic phase.

17. The method of claim 12 where the minimum time period and the maximum time period for the anaerobic phase are automatically governed using a timer in communication with said processor.

18. The method of claim 17 where the minimum time period for the anaerobic phase is 10 minutes and the maximum time period for the anaerobic phase is 1.5 hours.

19. The method of claim 1 further comprising the addition of a chemical additive.

20. The method of claim 19 where the chemical additive is a metal salt or a carbon source.

21. The method of claim 20 where the metal salt addition is determined using a rate based approach or a preset approach.

22. The method of claim 21 where said rate based approach comprises using said processor to derive an actual rate of phosphate elimination from the phosphate concentration determined by said phosphate analyzer and comparing said actual rate of phosphate elimination to a target rate of phosphate elimination and adding said metal salt only when said processor determines the actual rate of phosphate elimination is not sufficient to drive the phosphate concentration to substantially 0 mg/L by the end of the oxic phase.

23. The method of claim 22 where the actual rate of phosphate elimination is determined after a preset time period by a timer in communication with said processor.

24. The method of claim 22 where a quantity of metal salt added is determined by the difference between the actual rate of phosphate elimination and the target rate of phosphate elimination.

25. The method of claim 21 where said preset approach comprises using said phosphate analyzer to determine the phosphate concentration and adding a quantity of the metal salt based on the phosphate concentration.

26. The method of claim 19 where the carbon source addition is determined using a rate based approach or a preset approach.

27. The method of claim 26 where said rate based approach comprises using said processor to derive an actual rate of nitrate elimination from the nitrate concentration determined by said nitrate analyzer and comparing said actual rate of nitrate elimination to a target rate of nitrate elimination and adding said carbon source only when said processor determines the actual rate of nitrate elimination is not sufficient to drive the nitrate concentration to substantially 0 mg/L by the end of the anoxic phase.

28. The method of claim 27 where the actual rate of nitrate elimination is determined after a preset time period by a timer in communication with said processor.

29. The method of claim 27 where a quantity of carbon source added is determined by the difference between the actual rate of nitrate elimination and the target rate of nitrate elimination.

30. The method of claim 26 where said preset approach comprises using said nitrate analyzer to determine the nitrate concentration and adding a quantity of the carbon source based on the phosphate concentration.

* * * * *